United States Patent
Bennett et al.

[11] 3,938,681
[45] Feb. 17, 1976

[54] GRAPPLING HAYFORK

[75] Inventors: Max E. Bennett; James Edson McCanse, both of Oregon, Ill.; Gordon L. Lawson, Postville; William H. Clark, Waukon, both of Iowa

[73] Assignee: Hesston Corporation, Hesston, Kans.

[22] Filed: Apr. 8, 1974

[21] Appl. No.: 458,523

[52] U.S. Cl.............................. 214/147 G; 294/107
[51] Int. Cl.².......................................... B66C 3/04
[58] Field of Search...... 214/147 G, 147 R; 294/107

[56] References Cited
UNITED STATES PATENTS

| | | | |
|---|---|---|---|
| 839,479 | 12/1906 | Howe | 214/147 G X |
| 2,474,374 | 6/1949 | Shattuck | 294/107 X |
| 3,055,521 | 9/1962 | Crampton | 214/147 G |
| 3,777,918 | 12/1973 | Barber | 214/147 G |

FOREIGN PATENTS OR APPLICATIONS

| | | | |
|---|---|---|---|
| 603,601 | 4/1960 | Italy | 294/107 |
| 233,771 | 5/1964 | Austria | 214/147 R |

*Primary Examiner*—Robert G. Sheridan
*Assistant Examiner*—George F. Abraham

[57] ABSTRACT

A vertically swingable boom is provided with a downwardly opening grappling fork having horizontally swingable tines that are operated in unison by mechanism reciprocable vertically across the outer end of the boom. Power is supplied to the mechanism via a vertically swingable rocker and a fluid pressure piston and cylinder assembly lying along the boom and having a ram coupled with the rocker that reciprocates toward and away from the fork. Special geometrical and tolerance relationships between the tines and the plunger mechanism permit certain of the tines to move more deeply into the grappled load than others if disproportionate resistances are encountered, all without subjecting the fork, the connecting mechanism, and the ram to excessive bending forces.

7 Claims, 6 Drawing Figures

GRAPPLING HAYFORK

This invention relates to a boom-mounted grapple fork adapted for use in the bulk handling of materials as, for example, hay or similar animal foodstuffs.

One important object of our invention is to provide a boom-mounted, downwardly opening grapple fork wherein, although actuation of the tines of the fork is made through generally vertically directed motion at the outer end of the boom, interference with overhead clearance is held to a minimum.

Another significant object of the invention is to isolate the fluid pressure piston and cylinder power assembly of the fork from bending loads which might otherwise tend to be placed thereon as a result of the application of disproportionate resistive forces to the tines during their penetration into a mass of material.

An additional important object of the invention is to provide an operating mechanism for the tines which permits certain of the tines to penetrate more deeply than others, to a limited extent and without damage thereto, should characteristics of the mass being handled necessitate such action.

Figure 1:
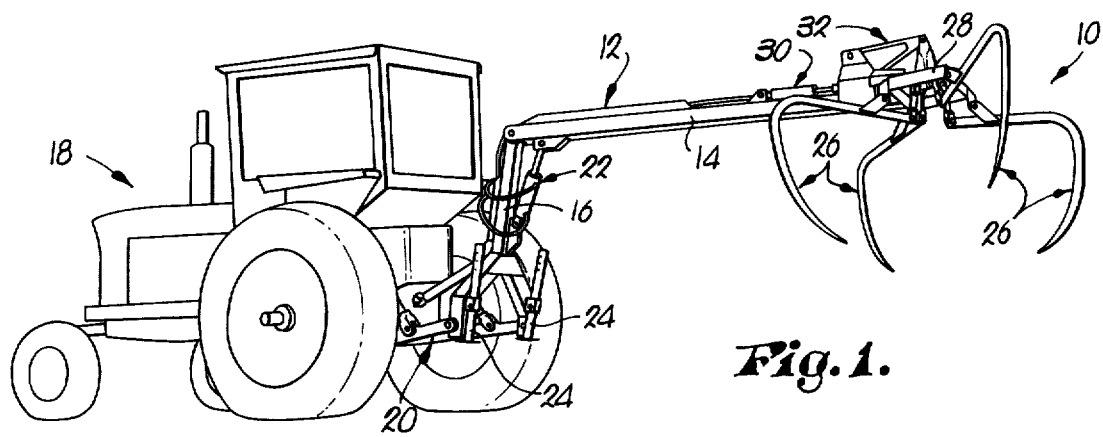
FIG. 1 is a rear perspective view of a boom-mounted grapple fork attached to the lift mechanism of a tractor and made pursuant to the present invention.
Figure 2:
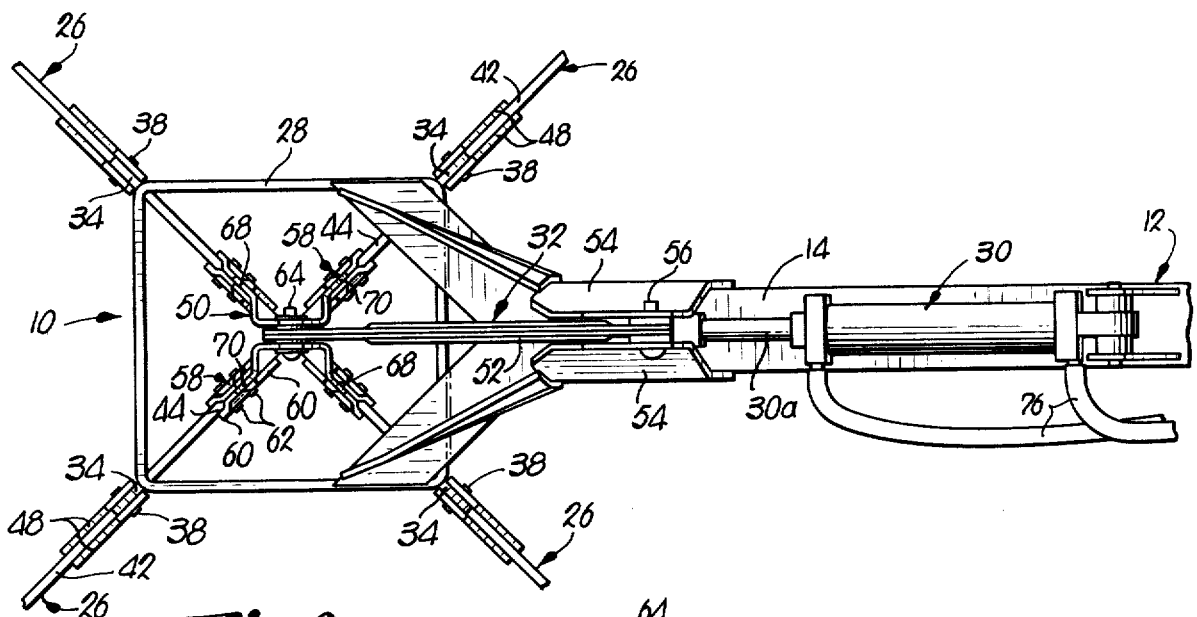
FIG. 2 is an enlarged, fragmentary, top plan view of the fork and the outer end of the boom.

A grapple fork assembly, broadly designated by the numeral 10 is carried on the free end of boom apparatus 12 comprising an elongated, vertically swingable boom 14 pivotally attached to a mast 16, the apparatus 12 being illustrated mounted on a vehicle 18, such as a tractor, having a conventional, three-point, power-lifting hitch 20. A fluid pressure piston and cylinder assembly 22 between mast 16 and boom 14 is utilized to swing the latter about a horizontal, transverse axis relative to the mast 16, and a pair of adjustable standards 24 are provided for stabilizing the vehicle and the apparatus 12 as required during operation thereof and/or for parking when disconnected from the tractor. The entire apparatus 12 may be raised and lowered relative to the tractor 18 through activation of the three-point hitch 20.

The grapple fork assembly 10 has a plurality of elongated, arcuate tines 26 pivotally attached to a rigid, open bottom and open top loop 28 affixed to the free end of the boom 14, a fluid-powered piston and cylinder assembly 30 carried by the boom 14, and shiftable linkage means broadly denoted by the numeral 32 interconnecting the actuator ram 30a of assembly 30 with the plurality of tines 26.

The loop 28 is quadrilateral and has outwardly and downwardly projecting attaching ears 34 at the four corners thereof to which the upright tines 26 are pivotally attached for swinging about respective, generally horizontally disposed, transverse axes 38.

Each tine 26 has a longitudinally curved lower section 40, provided with a point 41, and a generally straight, upper stretch 42 having an upper free end 44. Located along stretch 42 are a pair of transversely spaced attaching brackets 48 that connect with a corresponding one of the ears 34 through a suitable pivot pin defining the axis 38. Each axis 38 is thus disposed intermediate the ends 44 and 46 of its corresponding tine 26.

The linkage means 32 employed for transmitting power from assembly 30 to tines 26 includes two major sections, i.e., generally vertically reciprocable mechanism 50 that intercouples the upper ends 44 of tines 26 with one another for actuation of tines 26 in unison when mechanism 50 is reciprocated through the loop 28, and rocking bell crank structure 52 between mechanism 50 and ram 30a that translates the generally horizontal motion of the latter into vertically directed driving force for mechanism 50. The latter includes a quadrivaned plunger member 53 loosely suspended from one corner of crank 52 that is in turn pivotally carried by a pair of supports 54 provided with transverse, horizontal pivot 56. Mechanism 50 also includes a plurality of floating, elongated elements 58 having opposed bifurcated ends 60 that couple the tines 26 with member 53. The member 53 is elongated and of a generally triangular configuration, having upright, generally radial vanes 68 and 70 substantially quadrantally arranged and extending along the longitudinal axis of member 53. The vanes 68 and 70 converge toward the upper end of member 53, and a pivot hole 72 is located adjacent the lower outer corner of each vane 68 and 70. It is to be noted that the holes 72 of vanes 68 are vertically offset from those of the vanes 70. The lower edges 74 of the vanes 68 are angularly trimmed in order to provide clearance for the corresponding elements 58.

The for elements 58 each pivotally couple a respective tine 26 with the plunger member 53 at the holes 72 through the use of pivot pins 62. The member 53 is likewise swingably suspended from crank 52 through the use of a transverse pivot pin 64 with the connection having a predetermined amount of free play to permit limited side movement of the member 53. The axis of rotation of triangular crank is at a second corner thereof and is denoted by the numeral 56, the connection with ram 30a being at a third corner and denoted 57.

The bifurcated ends 60 of the elements 58 have a predetermined spacing sufficiently wide to loosely receive their respective vanes 68 or 70 and their respective tine ends 44 to permit a predetermined, limited amount of lateral movement of the member 53 and tines 26 relative to the elements 58. In this respect it must be noted that the pins 62 rather loosely retain the elements 58 to the member 53 and the tines 26 and, further, are of the type that prevent spreading of the ends 60 beyond the predetermined spacing width in the event abnormal side pressures are encountered. The over-width nature of the bifurcated ends 60 along with the looseness of the pins 62 combine to render the elements 58 in a "floating" condition relative to the member 53 and their respective tines 26. Also of importance is the fact that the pivotal coupling of each tine 26 with member 53 (defined by its link 58) is always maintained laterally offset from a center line drawn between the pivoting axis 64 of member 53 and the swinging axis 38 of the tine 26, thus effecting somewhat of a toggle relationship between mechanism 50 and tines 26 which is of significant benefit during operation of apparatus 12 as will hereinafter be made clear.

Figure 3:
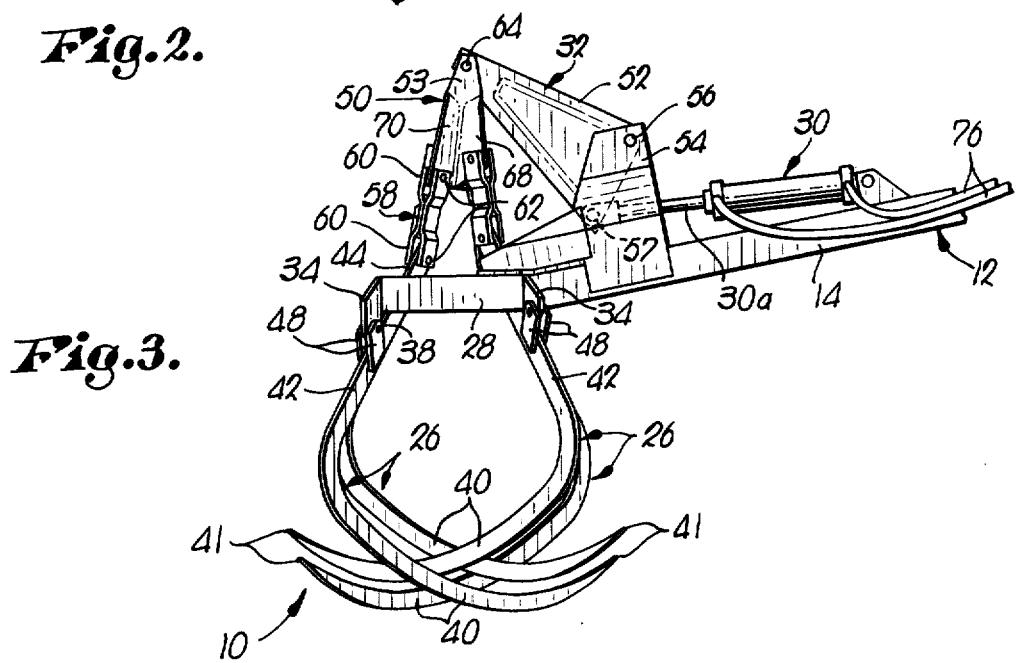
FIG. 3 is an enlarged, fragmentary, side elevational view of the fork in its closed condition.
Figure 6:
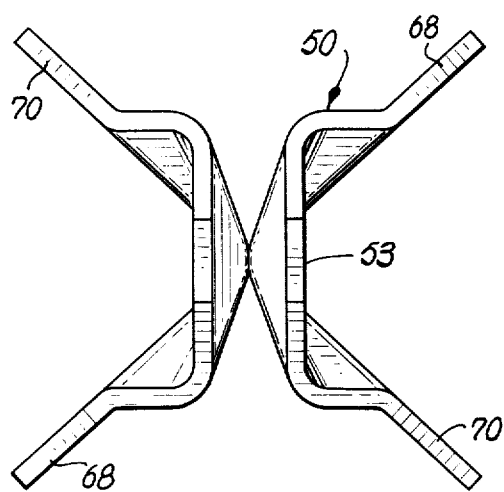
FIG. 6 is a top plan view of the plunger member.
Figure 5:
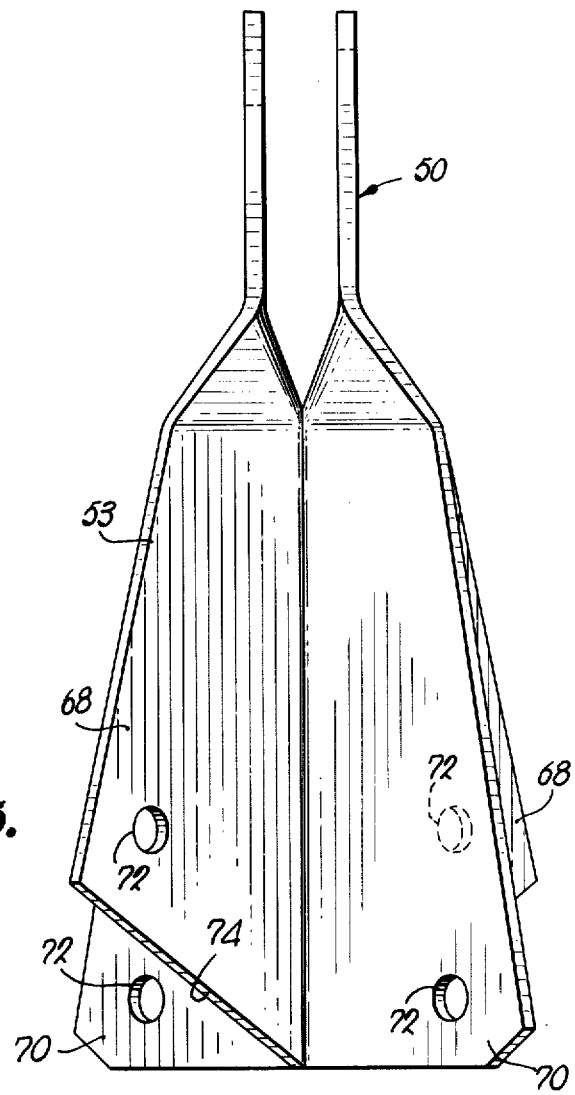
FIG. 5 is a still further enlarged, elevational, detailed view of the plunger member employed in the linkage mechanism for the tines of the fork.

As is best shown in FIG. 3, it will be seen that the tines 26 are arranged in diametrically opposed pairs with the pivotal axes 38 of one pair slightly vertically offset from those of the other pair, the two pairs being disposed at right angles to one another. In this connection it is to be further observed that because of this differential in vertical location of the axes 38, the axes as defined by the pins 62 of the elements 58 are similarly offset in their connections with the tines 26 and the member 50. With the axes so arranged when the fork is closed, the curved sections 40 in each pair of tines 26 are disposed in side-by-side relationship, while the sections 40 of one pair of tines 26 are disposed subjacent to the sections 40 of the other pair of tines 26.

OPERATION

The tractor 18 is backed to a stack of hay or other animal foodstuffs with the tines 26 fully spread apart as illustrated in FIG. 1, whereupon the boom 14 may be raised to an appropriate height through assembly 22 as may be required to reach the top of the stack or pile of material. Release of hydraulic pressure within assembly 22 allows boom 14 to swing downwardly, engaging the grappling fork with the material. Then, the ram 30a of assembly 30 is extended from its FIG. 4 position toward that of FIG. 3 to rock crank 52 in a clockwise direction viewng FIG. 3, whereby to pull mechanism 50 upwardly through loop 28 and thereby close the tines 26 about the material. The extent to which tines 26 approach the condition illustrated in FIG. 3 depends, of course, upon the size of the mass being handled, and also upon the ease with which tines 26 can penetrate such mass.

Once tines 26 have fully grasped the material, boom 14 may again be raised by actuating the assembly 22, whereupon nthe material may be transported to a selected site and dumped by retracting the ram 30a of assembly 30 to swing crank 23 counterclockwise viewing FIG. 3, thus opening the tines 26.

Pursuant to the goals of the invention as initially outlined, it will be recognized that, throughout operation of the fork assembly 10, the ram 30a is totally isolated from any bending stresses which might be applied by the tines 26 during their actuation. In this respect, the ram 30a is not only made remote from the tines 26 by virtue of the crank 52, but also by the additional existence of the plunger member 53 and the links 58. Should any undesirable forces be generated by the tines 26 during their closure about and into a load, therefore, such forces are absorbed and fully accommodated by the intermediate buffer means presented by links 58, plunger 53, and crank 52. Accordingly, ram 30a may be reciprocated without bending or twisting which might otherwise occur without the presence of such buffering means.

It is not unlikely that the tines 26 will be subjected to disproportionate resistive forces as they penetrate the mass of material to be handled. The material may not be of uniform density throughout, and there may be frozen masses, wads, or foreign objects present that engage the tines 26 as they move through the material, causing resistance to further penetration of the tines 26.

Figure 4:
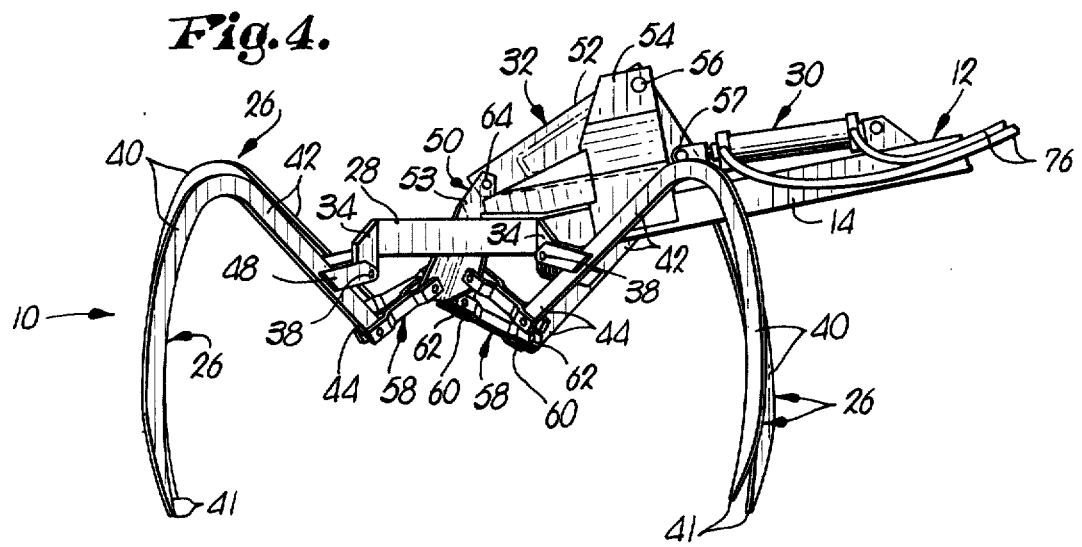
FIG. 4 is a view similar to that of FIG. 3 illustrating the fork in its open condition.

Such condition, however, can be accommodated in the present invention by virtue of the special toggle-like relationship between the mechanism 50 and each of the tines 26, as well as because of the relatively loose connections provided at strategic locations throughout mechanism 50. As earlier noted, the coupling of each tine 26 with the plunger member 53, defined by a link 58, is always maintained in a laterally offset relationship with a center line drawn between the axis 64 at the apex of member 53 and the axis 38 about which the tine 26 swings. This is true only when the fork is fully closed as illustrated in FIG. 3, but also when it is fully opened as illustrated in FIG. 4.

Accordingly, if, during swinging of the tines 26 toward one another during closing of the fork, one of the tines 26 should encounter a greater resistance than the other tines 26, the upper end 44 of the restricted tine will slow or stop swinging upwardly, creating an increased pull on its vane 68 or 70 of member 53. Accordingly, the member 53 is shifted sideways out of its normal path of reciprocation toward the restricted tine about the loose pivot 64. At the same time therefore, the upper end 44 of the opposite tine 26 is pulled by the deviating member 53 toward the upper end 44 of the restricted tine 26, hence causing such opposed tine to penetrate even more deeply into the mass of material. Thus, while one tine of an opposed pair of tines is restricted against further penetration, such action is compensated for by the opposing tine through continued and deeper penetration.

All of this is made possible by virtue of the ability of member 53 to deviate from its normal path of reciprocation toward the restricted tine when such becomes necessary. Moreover, if the offset relationship of each link 58 with a center line between axes 64 and 38 of its tine 26 did not exist, there would be no unusual pulling or pushing force directed to the member 53 by a restricted tine 26.

The differential compensating action afforded by the special relationship between mechanism 50 and tines 26 does not adversely affect those tines which are not subjected to unusual resistance during their introduction into the material being handled. Note, for example, that a restricted tine and its opposed partner are involved in the compensating action heretofore described. When the member 53 shifts toward the restricted tine, the member 53 can slide along the pivots 60 between the furcations of links 58 belonging to the remaining nonrestricted tines 26. That is, the two opposed tines 26 not encountering a resistance are not exposed to lateral bending forces by movement of the plunger member 53 toward a restricted tine because of the loose connections afforded by pivots 60 of the links 58 belonging to the unrestricted tines 26. Not only can the member 53 slide along the pivot 60 at the upper end of a link 58, but a link 58 can also move with its pivot 62 at the lower end thereof sideways relative to the upper end 44 of a tine 26 to which it is connected.

The above description of the special compensating action utilizes a single tine only as encountering resistance and illustrates the effects of such a condition. Such is done by way of example only, since, in practice, it is likely that unusual resistances may be encountered by more than a single tine during any given closing operation. The basic principles, however, remain enchanged inasmuch as the plunger member 53 can cock or swing about its loose pivot 64 in a number of directions as may be required, and all of the links 54 are loosely connected not only to the member 53 but also to their tines 26.

In addition, it is to be recognized that the arrangement of parts in accordance with the principles of the present invention permits a low profile to be imparted to the apparatus 12, which is especially important where overhead power lines and the like are likely to be present. Such is accomplished by orienting the assembly 30 so that the line of action of its ram 30a is along beam 14 rather than transversely thereof, such as would be the case were the assembly 30 stood on end and connected directly to mechanism 50 without the use of the intermediate bell crank 52. Hence, improved safety is obtained, as well as the benefit of additional buffering being presented between the tines 26 and the power assembly 30.

Having thus described the invention, what is claimed as new and desired to be secured by Letters Patent of the United States is:

1. In apparatus for handling animal foodstuffs:

an elongated lifting boom mounted at one end for vertical swinging movement toward and away from the ground;

a transversely extending, downwardly opening pickup fork on the opposite end of said boom having at least one pair of opposed tines mounted on the boom for generally horizontal swinging toward and away from one another to close and open said fork respectively, said fork including mechanism intercoupling said tines with one another for actuation thereof in unison when said mechanism is reciprocated transversely of said boom;

power means having a component reciprocable along said beam toward and away from said fork; and structure operably coupling said component with said mechanism for effecting said transverse reciprocation of the mechanism during said longitudinal reciprocation of said component whereby to open and close said fork, said mechanism including means permitting limited unequal swinging of said tines with respect to one another when uneven resistances are encountered during closing of the fork.

2. Apparatus as claimed in claim 1, wherein said means includes a plunger member pivotally connected to said structure, said tines being pivotally coupled with said member at opposed locations thereon, and each tine having its coupling with the member disposed laterally offset from a center line between the pivoting axis of the member and the swinging axis of the tine whereby resistance to further movement of one tine during closing of the fork is transmitted by the member to an opposing tine for continued, compensating movement of such opposed tine.

3. Apparatus as claimed in claim 2, wherein said coupling for each tine with said member includes a rigid link pivotally connected at one end to its tine and at the opposite end to said member.

4. Apparatus as claimed in claim 3, wherein each link is connected to said member and to its tine in a manner to permit limited individual shifting of the member and tine along the respective pivoting axes of the link.

5. Apparatus as claimed in claim 4, wherein said member is elongated, having a plurality of mounting vanes projecting radially outwardly from and extending along the longitudinal axis of the member, each of said vanes having a link pivoted thereto.

6. Apparatus as claimed in claim 5, wherein said vanes converge toward the connection of said member with said structure.

7. Apparatus as claimed in claim 3, wherein said boom is provided with a rigid loop at said opposite end of the boom open at its top and bottom, said member being coupled with said tines adjacent their normally uppermost ends and said loop supporting said tines intermediate their opposed ends for passage of the member through said top and bottom of the loop during reciprocation of the member.

* * * * *